March 19, 1929.  R. B. BEISEL  1,705,708
METAL TRUSS
Filed Aug. 31, 1926

INVENTOR
REX B. BEISEL
BY
ATTORNEY

Patented Mar. 19, 1929.

1,705,708

UNITED STATES PATENT OFFICE.

REX B. BEISEL, OF EAST HEMPSTEAD, NEW YORK, ASSIGNOR TO CURTISS AEROPLANE & MOTOR COMPANY, INC., A CORPORATION OF NEW YORK.

METAL TRUSS.

Application filed August 31, 1926. Serial No. 132,664.

My invention relates to aircraft and more particularly to a metallic aircraft truss.

In fabricating a built-up aircraft truss, it has been the practice heretofore, where chords of closed hollow section and an open web are provided, to either weld, rivet, or otherwise fasten all of the total number of web members to the inner walls only of the chords. While this practice is perfectly satisfactory in so far as the compression members of the web are concerned, it is far from satisfactory, and in fact dangerous, as regards the tension members of the web. Due to the fact that a welded, riveted or other type joint, under tension, is dependent wholly upon the amount of material used at the joint (either welded or riveted) such joint, as compared to a similar joint for a compression member, is weak, inefficient, and incapable of long withstanding distresses carried thereto.

As distinguished from said prior practice, it is an object of the present invention to strengthen and at the same time render absolutely dependable, the joint between the tension members of a truss web and the chords thereof. This added strength is obtained, not by enlarging the cross-sectional area of the tension members, but by providing instead, a dual weld or fastening between said tension members and the chords of the truss. The tension members at the joints instead of merely abutting the inner chord walls and being welded or riveted thereto, are carried into and thru both wall thicknesses (the inner and outer) and are welded thereto at both points of penetration. Thus fastened or joined the tension web members are held firmly in place and the area of the weld or rivet fastening is increased to such an extent as to render the joint absolutely dependable and entirely safe. Moreover, by extending the tension members into and thru the hollow chords, the latter, at the panel point or points, are very appreciably strengthened and reinforced.

Figure 1:
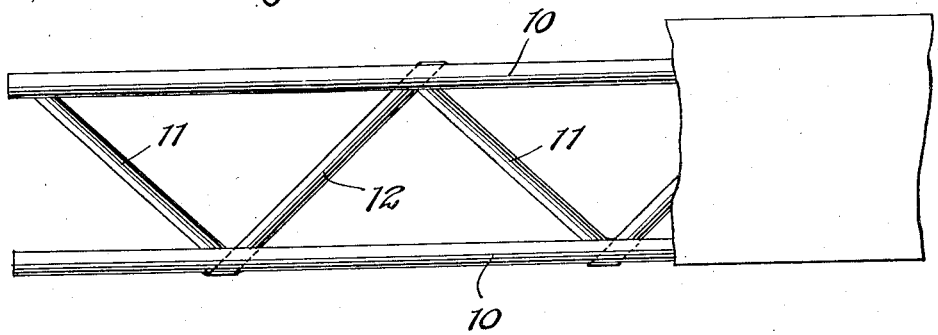
Figure 2:
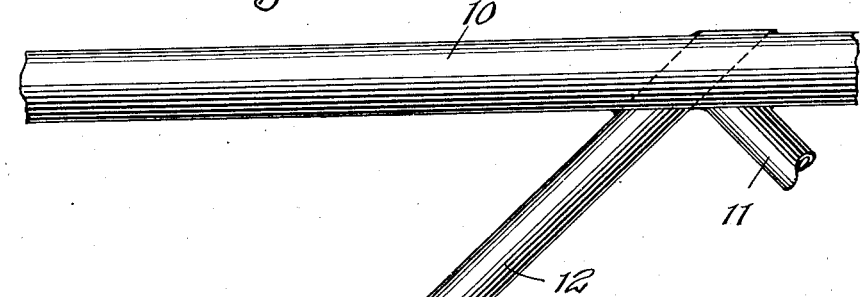
Figure 3:
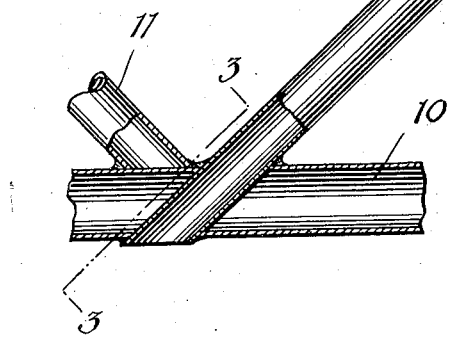
Figure 3:
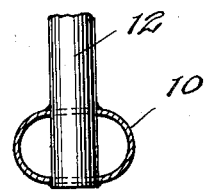

In the drawings wherein like reference characters denote like or corresponding parts, Fig. 1 is a side elevation of a lattice wing beam or metallic truss with a portion of the wing covering broken away;

Fig. 2 is an enlarged view, partly in section, of a fractional part of such beam showing the manner in which the tension members of the truss web are carried into and thru the hollow of the chords, and Fig. 3 is a section on the line 3—3 of Fig. 2.

In the embodiment of the invention selected for illustration, an aeroplane wing beam is shown. The invention, however, is susceptible of a wider range of use. If desired, a metallic truss of the character described may be used for other and different purposes in aeroplane or aircraft structures, or, it may be used in structures other than aircraft.

The chords of the truss are preferably of closed hollow section throughout. Said chords are designated respectively as 10—10. Preferably (see Fig. 3) the chords are formed of hollow metal tubing slightly flattened throughout. The web of the truss is likewise constructed of metal tubing and comprises compression web members 11 and tension web members 12 diagonally disposed. The compression web members 11 extend from one to the other of the chords 10—10 and abut at their opposite ends the inner walls thereof. At their abutting ends said compression web members are welded in place. Due to the fact that the stresses carried thru the compression web members tend to more firmly establish contact between the web member ends and the chords, a single weld area is ample in fixing the web member ends in place. The tension web members 12, as distinguished from the compression web members, as the stresses are distributed throughout the beam or truss, tend to pull away from the chords notwithstanding the fact that at the opposite ends of the tension web members they (the tension members) bear on the chords in close proximity to the corresponding ends of the compression members 11. To make the joints at the ends of the tension web members dependable and strong, said members, instead of terminating at the inner chord walls are carried therethru as well as thru the outer chord walls as shown. Thus extended a double weld area is provided at the two points of penetration, and since each tension web member is doubly welded the desired dependable and perfect joint is obtained. Moreover, by extending the tension web member ends into and thru the hollow chord members, the latter are greatly reinforced at the various panel points in the truss. An absolutely dependable, strong, inexpensive, and equally as light metal truss is the result. Such a truss is especially useful in aircraft.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. A truss for aircraft including tubular chords of closed hollow section and an open web in which certain of the tension members thereof are carried thru both wall thicknesses of the hollow chords where maximum chord depth is provided and are welded thereto at both said points of penetration, and in which certain of the compression members of the web are carried to, but not thru, and are butt-welded to the inner wall thickness only of said hollow chords.

2. A truss for aircraft including one piece tubular chords of hollow circular section and an open web in which the web members are likewise of hollow circular section, are of substantially constant cross-sectional area from end to end and are fastened to said hollow chords, the tension members of said web being carried at their opposite ends to and thru both wall thicknesses of the hollow chords where maximum chord depth is provided, and being welded to said hollow chords at both said points of penetration, and the compression members of each said web being carried to, but not thru, and butt-welded to the inner wall thickness only of said hollow chords.

In testimony whereof I hereunto affix my signature.

REX B. BEISEL.